US008793722B2

(12) United States Patent
Lecomte et al.

(10) Patent No.: US 8,793,722 B2
(45) Date of Patent: Jul. 29, 2014

(54) PROTECTION METHOD AND DEVICE FOR THE SECURE DISTRIBUTION OF AUDIO-VISUAL WORKS

(75) Inventors: Daniel Lecomte, Paris (FR); Sebastien Georges, Paris (FR)

(73) Assignee: Nagra France (FR)

( * ) Notice: Subject to any disclaimer, the term of this patent is extended or adjusted under 35 U.S.C. 154(b) by 1504 days.

(21) Appl. No.: 10/544,599

(22) PCT Filed: Feb. 4, 2004

(86) PCT No.: PCT/FR2004/050044
§ 371 (c)(1),
(2), (4) Date: Nov. 28, 2005

(87) PCT Pub. No.: WO2004/073291
PCT Pub. Date: Aug. 26, 2004

(65) Prior Publication Data
US 2006/0150233 A1    Jul. 6, 2006

(30) Foreign Application Priority Data

Feb. 4, 2003 (FR) ..................................... 03 01271

(51) Int. Cl.
*H04N 7/167* (2011.01)
*H04N 7/173* (2011.01)
(52) U.S. Cl.
USPC ................................ 725/31; 725/90; 725/118
(58) Field of Classification Search
USPC ................................ 725/25, 31, 90, 118, 133
See application file for complete search history.

(56) References Cited

U.S. PATENT DOCUMENTS

| 4,040,022 | A | * | 8/1977 | Takii | 713/503 |
| 5,196,933 | A | | 3/1993 | Henot | |
| 5,706,346 | A | * | 1/1998 | Katta et al. | 380/217 |
| 5,757,909 | A | * | 5/1998 | Park | 380/201 |

(Continued)

FOREIGN PATENT DOCUMENTS

| EP | 0 633 703 A2 | 1/1995 |
| EP | 0 648 055 A1 | 4/1995 |

(Continued)

OTHER PUBLICATIONS

Griwodz, C. et al., "Protecting VoD the Easier Way." Presented at *ACM Multimedia 1998*, Sep. 12-16, 1998, Bristol, UK, pp. 1-29.

(Continued)

*Primary Examiner* — Brian T Pendleton
*Assistant Examiner* — Jonathan V Lewis
(74) *Attorney, Agent, or Firm* — DLA Piper LLP (US)

(57) ABSTRACT

A process for secure distribution of video sequences coded in accordance with a nominal stream format including visual data and data for configuration of decoding of the stream that does not represent the visual data, wherein, prior to transmission to client equipment, an analysis is made of the stream for generating a modified main stream having a format of the nominal stream and having pictures/images modified by modification of the data for configuration of decoding, and complementary digital information of any format including digital information suitable to permit reconstruction of modified pictures, then, for separately transmitting the modified main stream and complementary digital information generated from a server to the client equipment, and wherein a synthesis of a stream in the nominal format is calculated on the client equipment as a function of the modified main stream and the complementary information.

15 Claims, 2 Drawing Sheets

(56) References Cited

U.S. PATENT DOCUMENTS

| | | | |
|---|---|---|---|
| 5,892,825 A | 4/1999 | Mages | |
| 5,912,970 A * | 6/1999 | Eck | 380/222 |
| 5,937,164 A | 8/1999 | Mages et al. | |
| 6,035,329 A | 3/2000 | Mages et al. | |
| 6,069,957 A * | 5/2000 | Richards | 380/281 |
| 6,185,306 B1 | 2/2001 | Mages et al. | |
| 6,334,026 B1 * | 12/2001 | Xue et al. | 386/337 |
| 6,345,388 B1 * | 2/2002 | Nishio et al. | 725/93 |
| 6,351,538 B1 | 2/2002 | Uz | |
| 6,415,031 B1 * | 7/2002 | Colligan et al. | 380/200 |
| 6,614,843 B1 * | 9/2003 | Gordon et al. | 375/240.01 |
| 6,668,022 B1 * | 12/2003 | Kim | 375/240.27 |
| 6,779,195 B2 * | 8/2004 | Oishi et al. | 725/68 |
| 6,823,131 B2 * | 11/2004 | Abelard et al. | 386/343 |
| 7,010,125 B2 * | 3/2006 | Lotspiech et al. | 380/242 |
| 7,096,481 B1 * | 8/2006 | Forecast et al. | 725/32 |
| 7,280,475 B2 * | 10/2007 | Tanaka et al. | 370/235 |
| 7,327,936 B2 | 2/2008 | Lecomte | |
| 7,428,755 B2 | 9/2008 | Lecomte | |
| 7,660,328 B1 * | 2/2010 | Oz et al. | 370/466 |
| 7,864,759 B2 | 1/2011 | LeComte et al. | |
| 2001/0028725 A1 * | 10/2001 | Nakagawa et al. | 382/100 |
| 2002/0018565 A1 | 2/2002 | Luttrell et al. | |
| 2002/0023165 A1 * | 2/2002 | Lahr | 709/231 |
| 2002/0026636 A1 | 2/2002 | LeComte | |
| 2002/0059643 A1 * | 5/2002 | Kitamura et al. | 725/136 |
| 2002/0061105 A1 * | 5/2002 | Nakamura | 380/203 |
| 2002/0076049 A1 * | 6/2002 | Boykin et al. | 380/211 |
| 2002/0087995 A1 * | 7/2002 | Pedlow, Jr. | 725/87 |
| 2003/0005455 A1 * | 1/2003 | Bowers | 725/90 |
| 2003/0011714 A1 * | 1/2003 | Nevins, Jr. | 348/589 |
| 2003/0014760 A1 * | 1/2003 | Yamauchi et al. | 725/105 |
| 2003/0028890 A1 * | 2/2003 | Swart et al. | 725/91 |
| 2003/0046686 A1 * | 3/2003 | Candelore et al. | 725/31 |
| 2003/0079222 A1 * | 4/2003 | Boykin et al. | 725/31 |
| 2003/0200548 A1 * | 10/2003 | Baran et al. | 725/90 |
| 2004/0083487 A1 * | 4/2004 | Collens et al. | 725/31 |
| 2004/0218906 A1 * | 11/2004 | Chaney | 386/94 |
| 2005/0155073 A1 | 7/2005 | Lecomte | |
| 2005/0185821 A1 | 8/2005 | LeComte et al. | |
| 2005/0193409 A1 | 9/2005 | LeComte et al. | |
| 2006/0184985 A1 | 8/2006 | LeComte et al. | |
| 2006/0215875 A1 | 9/2006 | LeComte et al. | |
| 2009/0022165 A1 * | 1/2009 | Candelore et al. | 370/400 |

FOREIGN PATENT DOCUMENTS

| | | |
|---|---|---|
| EP | 0 778 513 A2 | 6/1997 |
| EP | 0 993 142 A1 | 4/2000 |
| EP | 1 470 714 | 10/2004 |
| EP | 1 470 722 | 10/2004 |
| EP | 1 477 009 | 11/2004 |
| EP | 1 559 270 | 8/2005 |
| EP | 1 570 672 | 9/2005 |
| EP | 1 588 561 | 10/2005 |
| EP | 1 588 563 | 10/2005 |
| EP | 1 547 364 | 6/2006 |
| FR | 2 789 780 A1 | 8/2000 |
| FR | 2 812 147 A1 | 1/2002 |
| WO | 00/60846 A2 | 10/2000 |
| WO | WO 01/65762 A2 | 9/2001 |
| WO | WO 01/69354 A2 | 9/2001 |
| WO | 03/063445 A1 | 7/2003 |
| WO | 03/065725 A1 | 8/2003 |
| WO | 03/065731 A1 | 8/2003 |
| WO | 2004/032478 A2 | 4/2004 |
| WO | 2004/032510 A1 | 4/2004 |
| WO | 2004/056114 A1 | 7/2004 |
| WO | 2004/062287 A2 | 7/2004 |
| WO | 2004/068858 A2 | 8/2004 |

OTHER PUBLICATIONS

Wu, S.F. et al., "Run-Time Performance Evaluation for a Secure MPEG System Supporting both Selective Watermarking and Encryption," *JSAC (special issue on Copyright and Privacy Protection)*, Mar. 1, 1997, pp. 0-29.

Wu, T-L. et al., "Selective Encryption and Watermarking of MPEG Video," *International Conference on Image Science, Systems, and Technology, CISST'97*, Feb. 17, 1997, pp. 0-9.

International Standard, "Information Technology—Generic Coding of Moving Pictures and Associated Audio Information: Systems," *ISO/IEC 13818-1*, Second Edition, Dec. 1, 2000, cover and pp. ii-154.

International Standard, "Information Technology—Coding of Audio-Visual Objects—Part 2: Visual," *ISO/IEC 14496-2*, Second Edition, Dec. 1, 2001, cover and pp. ii-517.

Lo, V., "A Beginners Guide for MPEG-2 Standard," printout from Website Sep. 29, 2011, dated Dec. 7, 1998, pp. 1-8.

Fogg, C., "MPEG-2 FAQ," printout from Website Jun. 13, 2011, dated Apr. 2, 1996, pp. 1-33.

Koenen, R., "MPEG-4 Overview—(V.21—Jeju Version)," printout from *International Organisation for Standardisation—ISO/IEC JTC1/SC29/2G11 N4668*, Mar. 2002, pp. 1-60.

"Information Technology—Generic Coding of Moving Pictures and Associated Audio," *International Organization for Standardization ISO/IEC JTC1/SC29/WG11 N0702*, Mar. 25, 1994, cover and pp. i-202.

\* cited by examiner

PROTECTION METHOD AND DEVICE FOR THE SECURE DISTRIBUTION OF AUDIO-VISUAL WORKS

RELATED APPLICATION

This is a §371 of International Application No. PCT/FR2004/055044, with an international filing date of Feb. 4, 2004 (WO 2004/073291, published Aug. 26, 2004), which is based on French Patent Application No. 03/01271, filed Feb. 4, 2003.

FIELD OF THE INVENTION

This invention relates to the processing, broadcasting, recording and secure viewing of video data and television programs, or more generally any program or multimedia sequence using a nominal stream format of the MPEG type by authorized users and provides a secure system for processing, broadcasting delivery, recording, private copy and viewing of programs and interactive video or multimedia sequences.

BACKGROUND

The general problem is to furnish a device capable of transmitting in a secure manner a set of high-quality visual films in a format of the MPEG type directly to a TV screen and/or for being recorded on the hard disk of a box connecting the telecommunication network to the television screen while preserving the audiovisual quality yet avoiding any fraudulent use such as the possibility of making pirated copies of films or audiovisual programs recorded on the hard disk of the decoder box.

It is possible with current solutions to transmit films and audiovisual programs in digital form via broadcasting networks of the microwave, cable, satellite, etc. type or via telecommunication networks of the DSL (Digital Subscriber Line) type or BLR (local radio loop) type or via DAB (Digital Audio Broadcasting) networks. Furthermore, in order to avoid the pirating of works broadcasted in this manner, they are frequently encrypted by various means well-known to an expert in the art.

However, the main disadvantage of current solutions (WO 01/65762) is the fact that it is necessary to transmit not only the encrypted data to the users but also the decryption keys. Transmission of the decryption keys can be made before, at the same time as or after the transmission of the audiovisual programs. To increase the security and therefore the protection of audiovisual works against ill-intended usage, the decryption keys as well as the decryption functions of audiovisual decoders can comprise improved security means such as smartcards or other physical keys that can optionally be remotely updated.

Thus, the current solutions applied to a decoder box with the possibility of local recording of audiovisual programs in digital form on any support of the hard disk type or other memory type offer an ill-intentioned user the possibility of making non-authorized copies of programs recorded in this manner since at a given moment this user possesses, with a digital decoder box, whether associated or not with smartcard systems, all the information, software programs and date that permit complete decryption of audiovisual programs. Precisely on account of the fact that the user possesses all the data, the ill-intentioned user has the possibility of making illegal copies without anyone perceiving this fraudulent copy at the moment at which it is made.

One solution would therefore consist of transmitting all or part of a digital audiovisual program solely on demand (on-demand video services) via a broadband telecommunication network of the fiber optic type, ADSL, cable or satellite type without authorizing local recording of audiovisual programs. In this instance, the disadvantage is quite different and stems from the performance of these networks, that do not permit continuous streams of several megabits per second to each user to be guaranteed as required by MPEG streams, that require bandwidths of several hundreds of kilobits at several megabits per second.

Under these conditions, one solution consists of separating the stream into two parts, neither one of which would be usable by itself. For example, EP 0778513 teaches a process that permits the prevention of the illegal use of information by adding control information to it to verify the rights of the user. The system permits permanent knowledge of which part of the information is used and by which user and to know from this information whether the user is illegal or not. Thus, this process secures the data by adding additional information to it that denatures the initial information.

U.S. Pat. No. 5,937,164 makes use of the solution consisting of separating the stream into two parts of which the smallest one holds information necessary for using the largest one. However, that patent is insufficient to responding to the problem identified. In fact, suppressing a part of the stream denatures the format of the stream and it can therefore not be recognized as a standard stream that can be exploited with general software applications. That process requires at the same time specific software on the server side for separating the two parts, and other specific software that ensures not only reconstruction of the stream, but also acquisition of the main stream and its exploitation according to a format proprietary to the solution. That proprietary format is not the initial format of the stream prior to being separated into two parts.

U.S. Pat. No. 5,892,825 resumes the preceding patent, but with a smaller scope because the streams in it are always encrypted U.S. Pat. No. 6,035,329 is based on the same principle and concerns a process permitting reading a disk of the CD-ROM or DVD-ROM type conditioned on the identification of rights by the insertion of a smartcard on which the information necessary for the reading are stored. That process is still not sufficient because it does not guarantee that the modified stream is of the same format as the original stream. Finally, U.S. Pat. No. 6,185,306 relates to a process for the transmission of encrypted data from a Website to a requesting computer. However, that process allows the user to have available at a given moment all the tools necessary for copying the data.

SUMMARY OF THE INVENTION

This invention relates to a process for secure distribution of video sequences coded in accordance with a nominal stream format including visual data and data for configuration of decoding of the stream that does not represent the visual data, wherein, prior to transmission to client equipment, an analysis is made of the stream for generating a modified main stream having a format of the nominal stream and having pictures/images modified by modification of the data for configuration of decoding, and complementary digital information of any format including digital information suitable to permit reconstruction of modified pictures, then, for separately transmitting the modified main stream and complementary digital information generated from a server to the client equipment, and wherein a synthesis of a stream in the nominal format is calculated on the client equipment as a function of the modified main stream and the complementary information.

This invention also relates to a system for secure distribution of video sequences including apparatus for production of the video stream, at least one device for re-composition and viewing of a video stream and at least one telecommunication network between the production apparatus and the device of re-composition equipment.

BRIEF DESCRIPTION OF THE DRAWINGS

The invention will be better understood from a reading of the following description of a non-limiting exemplary embodiment referring to the attached drawings.

DETAILED DESCRIPTION

This invention therefore provides a system that permits the visual scrambling and recomposing of digital video content. The invention also permits a total control of the use of copies and of the rights of broadcasted works.

This invention relates more particularly to a process for the secure distribution of video sequences coded in accordance with a nominal stream format constituted of visual data and data for the configuration of decoding the stream that does not represent the visual data, characterized in that prior to transmission to client equipment, an analysis is made of the stream for generating a modified main stream having the format of the nominal stream and having pictures/images modified by the modification of this data for the configuration of the decoding, and complementary digital information of any format comprising the digital information suitable for permitting the reconstruction of these modified pictures, then for separately transmitting the modified main stream and the complementary digital information from the server to the addressed equipment, and that a synthesis of a stream in the nominal format is calculated on the addressed equipment as a function of the modified main stream and of the complementary information.

The nominal stream format advantageously comprises pictures comprising blocks of coefficients and the data for the configuration of the decoding is data defining the mode of organization of these coefficients in the nominal stream for its transmission.

According to one aspect, the nominal stream format comprises pictures comprising blocks of coefficients and the coefficients are quantified according to at least one quantification step and the data for the configuration of the decoding is data permitting the calculation of these quantification steps.

The nominal stream format preferably comprises pictures comprising blocks of coefficients and at least one of the coefficients is calculated from a previously determined "predictor" and from a "differential value" contained in the stream for the coefficient, which decoding configuration data is data permitting calculation of the re-initialization values of the predictor.

According to a particular embodiment a plurality of decoding parameters defined by the decoding configuration data is modified.

The modifications made to the decoding configuration data preferably vary during the analysis.

According to a particular aspect, the nominal stream format is based on the MPEG-2 norm.

The invention also relates to a system for the secure distribution of video sequences comprising equipment for the production of a video stream, at least one piece of equipment for the re-composition and viewing of a video stream and at least one telecommunication network between the production equipment and the piece or pieces of re-composition equipment of the user or users.

The general principle of a process for securing a video stream is disclosed as follows. It is advantageous to authorize video services on demand and à la carte via broadcasting networks and the local recording in the digital decoder box of the user. The solution comprises permanently retaining the part of the recorded audiovisual program remotely from the dwelling of the user and, in fact, in the broadcasting and transmission network, which part is essential for viewing the audiovisual program on a television screen or a screen of the monitor type, but which has a very small volume relative to the total volume of the digital audiovisual program recorded at the user's location. The lacking part will be transmitted via the broadcasting that at the moment of the viewing of the digital audiovisual program pre-recorded at the user's location.

Thus, the greatest part of the audiovisual stream will be transmitted via a classic broadcasting network whereas the lacking part will be sent on demand via a narrow-band telecommunication network such as the classic telephone networks or cellular networks of the GSM, GPRS or UMTS types or by using a small part of a network of the DSL or BLR (local radio loop) type, or also by using a subset of the bandwidth divided on a cable network.

Figure 1:
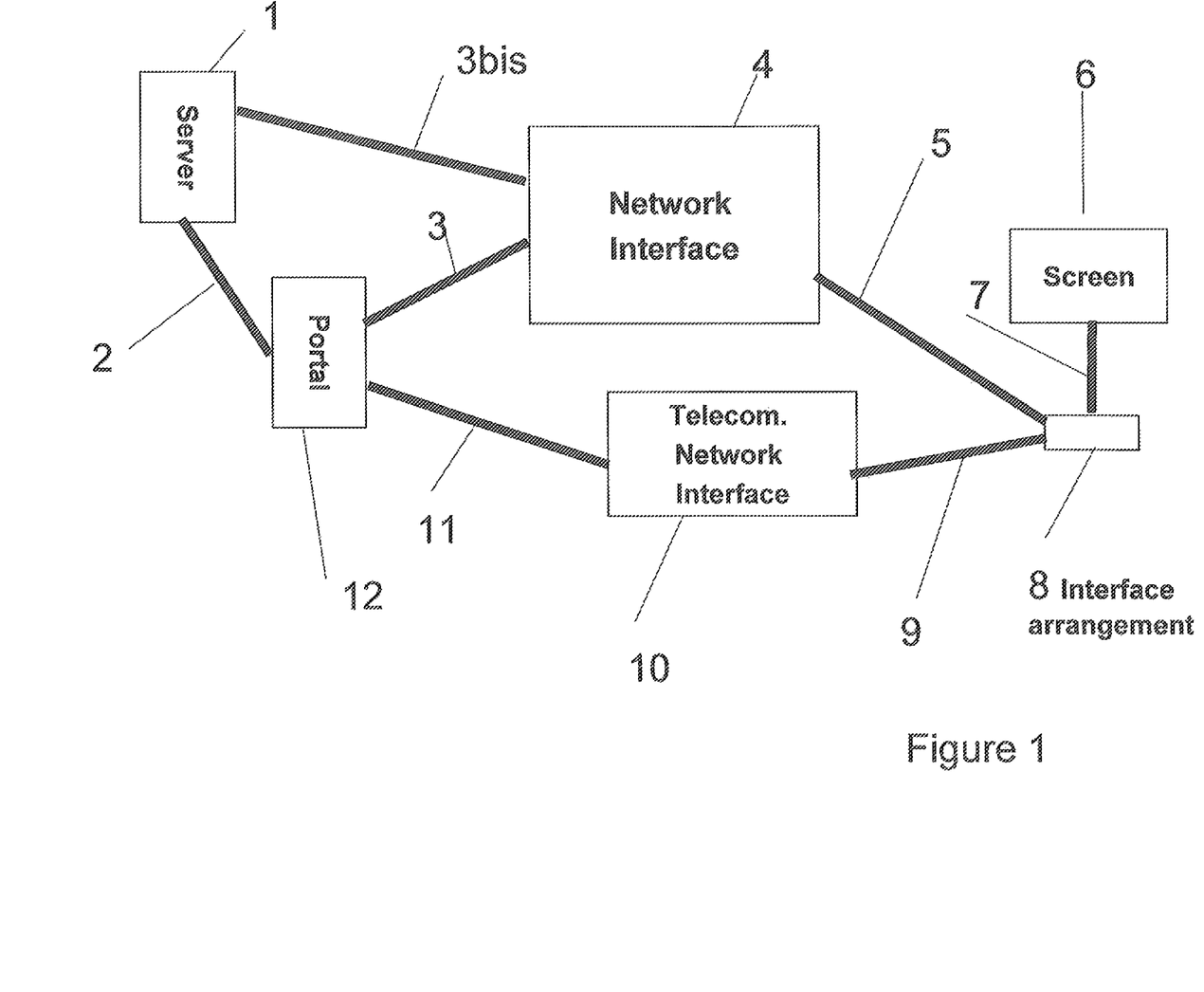
FIG. 1 schematically shows the total architecture of a system for implementing the process of the invention.
Figure 2:
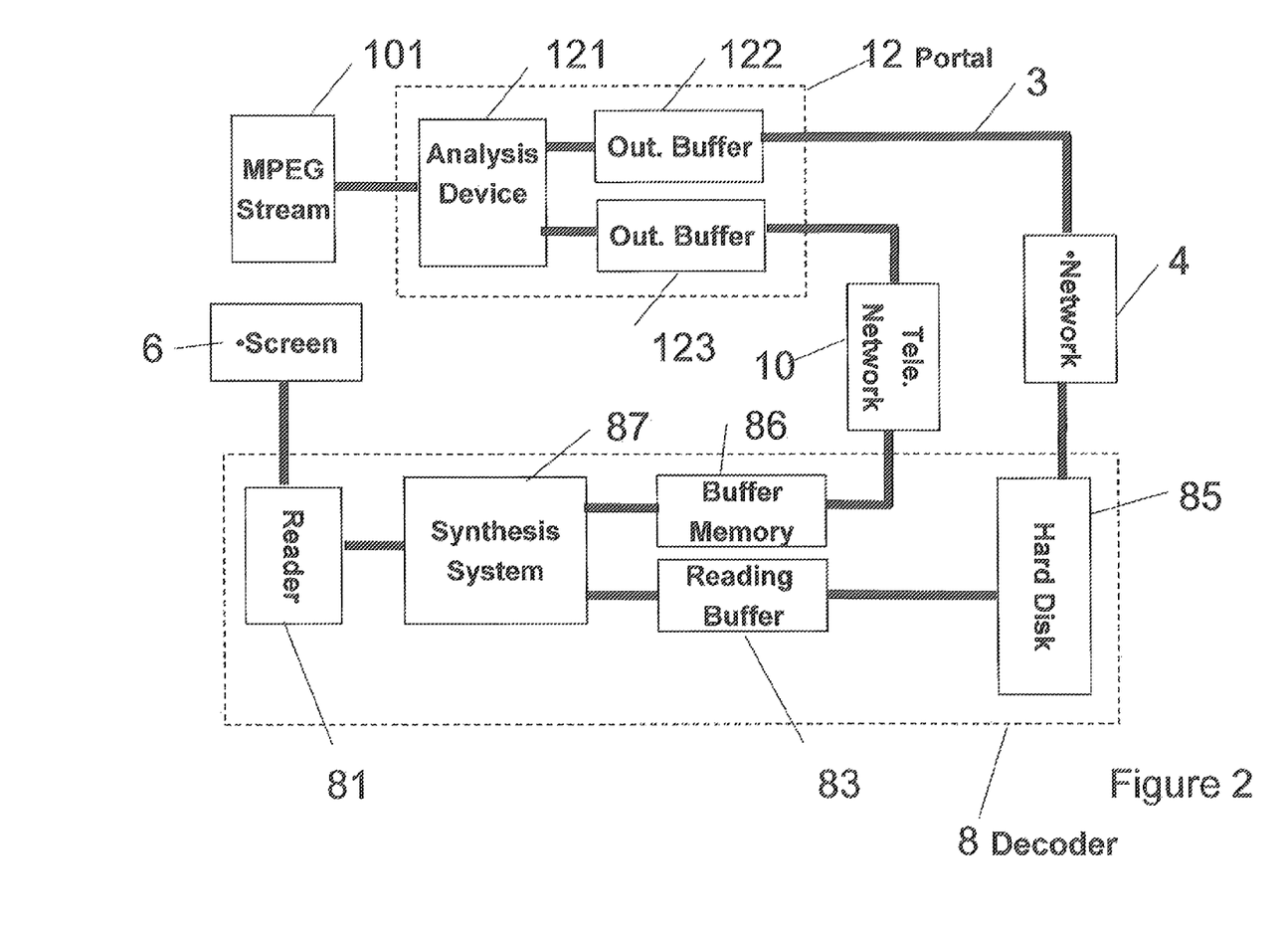
FIG. 2 schematically represents a particular embodiment of the system for the analysis and synthesis of the stream of the MPEG type in conformity with the invention.

In the attached drawings, FIG. 1 shows a scheme of a distribution system in accordance with the present invention. FIG. 2 shows a particular embodiment of the system for the analysis and synthesis of streams in conformity with aspects of the invention.

In FIG. 1, the video interface arrangement 8 is adapted to connect at least one display device, e.g., a monitor, a video projector or a device of the television screen type 6 to at least one broadband transmission and broadcasting network interface 4 and to at least one telecommunication network interface 10. This arrangement is composed of a module 8 primarily comprising on the one hand a processing unit adapted to process and in particular decode and descramble any video stream of the MPEG type in accordance with a pre-loaded decoding and descrambling software program in such a manner as to display it in real or differed time, store it, record it and/or send it to a telecommunication network and comprising, on the other hand, at least one screen 7 interface and an interface for connection to a local or extended network 5 and/or 9. Transmission and broadband broadcasting network 4 and telecommunication network 10 can be combined into one network.

The hard disk of the module 8 can be used as buffer memory for temporarily storing at least one part of the program or of the video sequence to be displayed in case of deferred viewing or of a limitation in the broadband of the transmission network. The viewing can be delayed or deferred upon the request of the user or of the portal 12.

As FIG. 1 shows, connection interface 5 is connected to a broadband transmission and broadcasting network 4 such as modem, satellite modem cable modem, fiber-optic line interface or a radio or infrared interface for wireless communication.

The content of audiovisual programs such as films will be transmitted via this classic connection for video broadcasting. However, in order to not allow pirated copies to be made, the system retains a small part of the audiovisual content in portal 12 before transmitting the audiovisual content from server 1 or portal 12.

In the case of viewing an audiovisual program in real time, this small part of the audiovisual content retained in portal 12 will also be sent to module 8 via telecommunication network 10.

The invention is relative to a stream of the MPEG type, that is, whose characteristics are described as follows.

The format of the audiovisual stream used in the invention has the following characteristics:

The format must decompose the data into frames, each frame of which comprises at least one complete digital picture I (Intra) that is entirely coded and does not contain information about the movement;

Each picture I decomposes into a succession of blocks for which a certain number of simple, digitally coded visual elements are grouped (e.g., the Y components (luminance), Cb, Cr (chrominances) of a point of a picture, or frequency components);

The audiovisual stream in conformity with the format comprises information that is not represented visually and configures the parameters used by the reader adapted to this type of stream format during its decoding, which non-visual information permits, e.g., organization of digitally coded visual elements;

The visual elements are optionally completely or partially coded differentially, that is, their decoded value is obtained with the aid of a calculation concerning at the same time the value specified in the current block, but also the last value of the same decoded type, called "prediction value" (e.g., the one corresponding to the block that precedes the current block in the video stream in the case of an I image and of an MPEG-2 stream);

In a particular instance, the frame also comprises digital pictures called predicted relative to the preceding pictures (P pictures: predicted) or relative to the preceding and following pictures (B pictures: bidirectional). The B and P pictures are constituted in the same manner as the I pictures but are calculated by the difference relative to the reference pictures (compensation of movement and colorimetric difference). However, certain blocks of P and B pictures can be transmitted entirely (Intra blocks).

The development of the compression of an MPEG stream will now be described. This process applies to every stream format as described above and the MPEG instance is taken solely by way of non-limiting example.

An MPEG compression begins in a first time by decomposing the picture into different square matrices comprising several points or pixels, each of which has its own colorimetric value. A calculation permits the obtention of an average value for each matrix within which each point is now embedded. This processing generates a pixelization and the appearance of uniform solid colors where nuances of shading existed. The second stage of the MPEG compression consists of only retaining the elements changing from one picture to the other, whence the creation of type B or P pictures.

The video is represented as a succession of individual pictures, each one of which is processed as a bidimensional matrix of picture elements (pixels). The representation of the colors of each pixel comprises three components: A luminance component Y and two chrominance components Cb and Cr.

Compression of the digitized video is realized by using several techniques: Sample of chrominance information relative to the sensitivity of the human visual system (HVS), quantification, movement compensation (MC) for exploiting the temporal redundancy, transformation in the frequency area by discrete cosine transformation (DCT) for exploiting the spatial redundancy, variable length coding (VLC) and the interpolation of pictures.

As the human visual system is most sensitive to the resolution of the luminance component of a picture, the values of pixel Y are coded in full resolution. The human visual system is less sensitive to chrominance information. The sub-sampling illuminates the values of pixels based systematically on the position, which reduces the quantity of information to be compressed by other techniques. The norm retains a set of chrominance pixels for each 2×2 vicinity/neighborhood of luminance pixels.

The macroblock is the base coding unit of a picture. The macroblocks of each picture are coded successively from left to right and from top to bottom. Each macroblock is composed of 6 8×8 blocks: Four blocks of luminance Y, one block of chrominance Cb and one block of chrominance Cr. Note that the four luminance blocks cover the same picture zone as each of the chrominance blocks by virtue of the sub-sampling of the chrominance information performed for adapting the coding to the sensitivity of the human visual system.

For a given macroblock, the first operation is the selection of the coding mode that depends of the picture type, the efficacy of the prediction compensated in movement in the coded region, and the nature of the signal contained in the block. Secondly, a prediction compensated in movement of the block content based on prior or future reference pictures is formed. This prediction is subtracted from the real data of the current macroblock for forming an error signal. Thirdly, this error signal is divided into 6 8×8 blocks (4 luminance blocks and 2 chrominance blocks in each macroblock) and a discrete cosine transformation is applied to each of them. The resulting 8×8 block of DCT coefficients is scanned in zigzag to be converted into a one-dimensional chain of quantified DCT coefficients. After this transformation, the coefficients situated at the left top of the newly obtained block correspond to the weakest frequencies in the two dimensions whereas those obtained at the right bottom correspond to the highest frequencies. Fourthly, the related (subsidiary) information of the macroblocks (type, vectors, etc.) as well as the data of the quantified coefficients are coded. To obtain maximal efficacy a certain number of coding tables with varying length are defined for the different data elements. A coding of the range lengths is applied to the data of the quantified coefficients.

The DCT coefficient of point 0.0, upper left of the block, represents a zero horizontal and vertical frequency: It is called DC coefficient (continuous). Since the DC coefficient is proportional to the average value of the pixels of block 8×8, the differential coding permits a supplementary compression because the difference of the average values of the neighboring 8×8 blocks tends to be relatively small. The other coefficients represent one or several non-zero horizontal and/or vertical spatial frequencies and are called AC coefficients.

The differential coding of the DC coefficients makes use of the fact that the average values of the pixels of the successive 8×8 blocks are close. By virtue of this property, to code a DC coefficient, only the difference relative to the last coefficient of the same type (luminance or chrominance) coded is coded. In the decoding, the value of a coefficient is calculated from the value for the coefficient in the video stream and from the last value of the same type decoded. The last decoded value of the same type is called "predictor," whereas the value to be added to the predictor to obtain the real value of the quantified coefficient is called "differential coefficient". To avoid a divergence of values, the predictors are regularly re-initialized. The reader replaces the value of the predictor by a predetermined value contained in the stream at precise instants of the stream.

The invention concerns information that does not represent visual data of the stream, but that permits the reader of the MPEG stream to use the visual information in accordance with the above-described process in such a manner as to reconstitute a stream that is correct from the standpoint of human visual perception. The information that does not represent visual data is transmitted periodically in the stream in accordance with the norm used for the format of the stream. Modification of the non-visual information entrains the modification of the reconstitution and therefore the degradation of the stream from the standpoint of human visual perception.

Three non-limiting examples of the invention are described below in which the modified information respectively concerns the quantification of the blocks of DCT coefficients, the method of scanning the DCT blocks quantified in zigzag and the re-initialization values of the predictors of the DC coefficients with reference made to the attached figures. In the following, the information that does not represent visual data is called "decoding configuration information".

The invention uses the process for securing video streams described above. Thus, the invention comprises modifying all or part of the decoding configuration information and the new values are in conformity with the specifications of the norm in such a manner as to modify the interpretation made by the video reader of the digital data sequence in the modified main stream generated in this manner, and to put aside in complementary digital information of any format the original decoding configuration information and/or the functions necessary to reconstitute the original stream from the modified main stream and the complementary digital information. Reconstitution is realized during a synthesis stage on the addressed equipment.

While it is reading the binary stream a classic MPEG reader identifies the beginning of a coded picture, then the picture type. To avoid any confusion between a standard decoder box frequently called "set-top box or STB," the standard MPEG decoder will hereinafter be referred to as "reader" (player or viewer). This reader can be realized in hardware and/or in software. The MPEG reader successively decodes each macroblock of the picture. The picture is reconstructed when all its macroblocks have been processed. If an I picture is concerned, it constitutes a reference picture for the subsequent pictures and is stored in place of the oldest reference picture. The pictures are therefore available in digital form for post-processing and display as the application desires.

In the case of an audiovisual program of the MPEG type, all the characteristics of the pictures coming from server 1 or portal 12 are not transmitted to module 8. In particular, the characteristics not transmitted in conformity with the invention are decoding configuration information contained in the stream.

Certain decoding configuration information is retained in portal 12. On the other hand, instead of and in place of non-transmitted decoding configuration information the device in conformity with the invention intercalates false decoding configuration information of the same nature as the decoding configuration information removed and retained in portal 12 in such a manner that the standard MPEG reader of module 8 is not disturbed by these modifications which it will ignore and reconstitute an output MPEG stream at the output that will be incorrect from the visual standpoint for a human being, but correct from the standpoint of the MPEG format.

As can be seen in FIG. 1, connection interface 9 is connected to extended telecommunication network 10 directly or via a local network serving as access network and is constituted, e.g., by a subscriber line interface (analog or digital telephone network, DSL, BLR, GSM, GPRS, UMTS, etc.).

Thus, the audiovisual programs are broadcast in a classic manner in multi-broadcasting mode via broadband transmission network 4 of the microwave, cable, satellite, digital microwave, DSL, etc. type from server 1 directly via connection 3bis or via portal 12 via connections 2, 3 to decoder module 8 via connection 5. Each audiovisual program broadcast in this manner can be scrambled or non-scrambled and, in conformity with the invention, the streams of the MPEG type comprise modifications as described above. Certain audiovisual programs modified in this manner and incomplete are recorded on the hard disk of box 8 as a function of the parameters selected by the user or of information transmitted by the broadcasting server.

When the user desires to view an audiovisual program recorded in this manner on the hard disk of box 8, the user requests this in a classic manner with a remote control connected to his box 8 that then connects automatically to gate 12 via connection 9 of the local network and/or direct access type and via telecommunication network 10 connected itself to portal 12 via connection 11. During the entire viewing of the audiovisual program, connections 9 and 11 remain established and allow box 8 to receive the functions and the parameters for putting the modified decoding configuration information back in order. The decoding configuration information transmitted in this manner is never recorded on the hard disk of box 8 because the pictures reconstituted with these new values are displayed directly on viewing screen 6 via connection 7 after having been processed by the reader of box 8 from its volatile local memory. Once processed and visualized, the modified and/or lacking decoding configuration information that was transmitted by portal 12 is deleted from the volatile local memory of box 8.

In a first aspect, the invention comprises modifying the method of scanning quantified DCT blocks. The process determining the organization of the coefficients in MPEG will now be described. Once a block of quantified DCT coefficients has been calculated the digital information corresponding to this block is ordered/arranged in the file corresponding to the stream. Several method of organization can be used: It can be ordered by line, in zigzag starting from the top left coefficient in a random order. The order of the quantified DCT coefficients in a block is specified by the inclusion in the stream of digital information suitable for being interpreted by the reader. In the case of MPEG, two types of scanning the block are possible and defined. These two scanning types are known by the reader. The choice of the scanning type used for a block is determined by a bit included in the stream called "scanning bit" (its name in the MGEG-2 norm is "alternate_scan"). In order to know what scanning type was applied to the DCT coefficients of the block, the reader reads the corresponding bit and reconstitutes, as a function of the value of this bit, the block of quantified DCT coefficients from the sequence of coefficients in the stream. It is agreed that this calculation is performed at the same time as other calculations of the reader performed on the stream. The value of the scanning bit is transmitted periodically in the stream and stored by the decoder. Thus, the scanning bit can be transmitted to each picture, each group of pictures or a single time for the entire stream. As long as the value of the bit has not been modified, the reader uses the last scanning bit value transmitted to determine what type of scanning is to be performed on the block in the course of being decoded. In MPEG-2 the scanning bit is transmitted to each new picture, whatever its type (I, B or P), in the field called (picture coding extension) by the norm.

The example presented concerns MPEG-2 without this limiting the scope of the invention. In fact, the invention also relates to every type of format using information not represented visually to define the scanning type (that can be in a different form than a bit) and transmitted periodically (all the pictures, once for the entire stream or all the blocks).

The invention therefore modifies the original stream by inverting from time to time the value of the bit defining the scanning type. To this end, the invention makes use of the above-described process for securing video streams. The invention will be better understood from the following description presented with reference made to FIG. 2 of the attached drawings.

In this example, portal 121 has determined MPEG stream 101 that it is to send to user 8 for being viewed off-line on his-television screen 6. The user is connected to a digital cable broadcasting network 4 and a telecommunication network 10. Analysis system 121 of portal 12 therefore reads entering MPEG stream 101 and each time that it detects a picture, it identifies in the code the bit indicating the scanning type to be applied to the blocks of the picture ("scanning bit"). Analysis device 121 decides according to a random law to invert the scanning bit for the picture being processed. If the scanning bit of a picture is modified, analysis device 121 stores the reference of the picture in the complementary digital information. Once all the pictures of the stream have been analyzed, the complementary digital information stored in output buffer 123 therefore contains the references of all the pictures for which the scanning bit was inverted. The complementary digital information subsequently permits reconstitution of the start sequence in box 8 by a new inversion of the scanning bit for the pictures referenced in the complementary digital information.

On the other hand, the main MPEG stream modified by changing the value of the scanning bit for certain pictures is recorded in output buffer 122 to be broadcast on broadcasting network 4 via connection 3 to one or several users 8.

Each authorized decoder box 8 that desires to record the MPEG stream modified in this manner can then read the MPEG stream and record it on its hard disk 85. The recording initiative is left to decoder 8 under the control of portal 12. For this purpose, analysis system 121 had recorded/entered supplementary data information at the beginning or the MPEG stream that specified the addressees of the modified MPEG stream. The addressees can thus be a particular addressee 8, a group of addressees 8 or all decoders 8 connected to network 4.

The phase described above corresponds to the first phase of the preparation of the MPEG stream by portal 12, to its transmission via broadband network 4 and to its recording in a decoder 8. The decoder can then display the MPEG stream recorded on its hard disk 85. To this end, synthesis system 87 of decoder 8 reads the MPEG file from its hard disk 85 and sends it to a classic MPEG reader 81. If no complementary data is received by synthesis system 87, the MPEG stream arriving at reader 81 is processed and displayed as it is, which causes a significant distortion of the display on viewing screen 6. In fact, the pictures contained in a modified stream that are processed by synthesis system 87 do not correspond to the pictures that are necessary for a correct viewing since the blocks of certain pictures are reconstructed in accordance with a scanning type different from that of the original stream. On the other hand, as the recorded stream is a stream of the MPEG type and conforms to this standard, reader 81 does not make any difference and displays the information on output screen 6 that appears like data of a video MPEG stream, but is totally incoherent to a human being viewing screen 6. Every copy of the MPEG stream coming from hard disk 85 of box 8 will produce the same visual effect during its restitution by any MPEG reader. Therefore, any usage of the copy that might be ill-intentioned will fail.

When the user of decoder 8 wishes to actually view the audiovisual program recorded on his hard disk 85 on screen 6, the user requests this from synthesis system 87 with a remote control as with a VCR or a DVD reader having a menu on his television screen. Synthesis system 87 then makes a request to hard disk 85 and begins to analyze the modified MPEG stream coming from hard disk 85 via reading buffer 83. Synthesis system 87 then establishes a connection with portal 12 via telecommunication network 10, that is a DSL connection in the example. Once this connection is established and during the entire duration of the viewing of the film or of the audiovisual program, synthesis system 87 retrieves the references of the modified pictures of the stream recorded on hard disk 85 from buffer memory 123. These references arrive at synthesis system 87 via input buffer memory 86 and are temporarily stored in volatile memory 88 of synthesis system 87. When synthesis system 87 reads a picture from hard disk 85, which picture is referenced in the complementary information contained in volatile memory 88, it inverts the value of the scanning bit for this picture. The stream reconstituted in this manner is sent to reader 81 to be directly displayed on screen 6. During their use the references of modified pictures are deleted from volatile memory 88.

In the case in which the user views the visual content of the modified main stream, the result has a very strong pixelization effect: All the details are lost since the reconstruction of all the AC coefficients of the picture is erroneous.

According to a second example, the invention modifies the quantification parameters of the blocks with coefficient DCT.

The MPEG format makes use of the properties of the DCT coefficients to optimize compression of the video stream. Subsequently, the coding device applies a discrete cosine transformation (DCT) of the blocks to form blocks with DCT coefficients with the same size as the original blocks. Then, the compression device makes use of a quantification matrix stored in a memory connected to this compression device. The quantification matrix has the same size as the block to be quantified and is composed of coefficients called "quantification steps". Each DCT coefficient is divided by the corresponding quantification step form a quantified DCT coefficient (only the whole part of the result of the division is retained). For example, if the DCT coefficient has a value of 35 and the quantification step of 16, the quantified DCT coefficient will have a value of 2. Likewise, if the values are respectively 7 and 14, the result will be 0. In the MPEG-2 format the quantification steps a the bottom right (thus corresponding to the high-frequency coefficients of the DCT block) are elevated generate a large number of consecutive 0's during the scanning of the block. In fact, a large sequence of 0's permits the place taken by the coding of these coefficients (RLC coding "Run Level Coding" well-known to the expert in the art) to be reduced.

The quantification steps are transmitted periodically in the video stream and used by the video reader to recalculate estimations of the original non-quantified DCT coefficients and thus of the original block of pixels. In the case of MPEG-2 the quantification steps contained in the quantification matrix can be modified by the variable "Quantizer_scale_code". The importance of this variable is to be able to locally adapt the quantification steps for a zone of the picture without having to re-transmit a complete quantification matrix. As for the scanning bit, every time that a quantification step is transmitted in the stream it is used by the reader to de-quantify the DCT blocks until its substitution by another quantification step transmitted subsequently or re-initialized. In MPEG-2, the quantification steps are transmitted with different elements of the stream: In a "quant matrix extension" field as concerns the complete matrix, in a "slice" or "macroblock" field for "quantiser_scale_code".

The invention therefore relates to the decoding configuration information determining the quantification steps to be used. This second example follows the same process as the first example described above. The difference between these two examples is the type of modifications applied to the original stream and therefore the content of the complementary digital information sent in real time by server 12 to client 8.

Thus, in this second example, analysis system 121 of portal 12 therefore reads entering MPEG stream 101 and identifies in the code the digital data allowing the reader to calculate the quantification steps. Analysis device 121 decides for each set of data corresponding to quantification steps to modify or not modify this data, and if it decides to modify it, it replaces it with values selected randomly, but conforming to the format of the stream. In this instance, analysis device 121 stores in the complementary digital information the reference of the modified set of data in the stream and the original values of the quantification steps that were substituted. Once the entire stream has been analyzed, the complementary digital information stored in output buffer 123 contains the references in the stream of all the modified data and the original values of this data. The complementary digital information subsequently permits reconstitution of the starting sequence in box 8 by making a replacement of the random values of the quantification steps modified by the original values contained in the complementary digital information.

As in the first example, user 8 can decide to view the modified main stream stored on its hard disk without connecting to server 12. In this instance, since the modifications made to the stream do not modify the format of this stream, it will be displayed without problems on viewing screen 6, but will not be correct from the standpoint of human visual perception because certain blocks will have been reconstructed according to a bad quantification matrix.

If user 8 actually desires to view the original video stream, the user connects to server 12 and synthesis device 87 will reconstruct the original stream from the modified main stream and from the real values of the quantification steps contained in the complementary digital information.

In the instance in which the user is viewing the visual content of the modified main stream the result has a very strong quantification noise: The details constituting the picture are greatly exaggerated or disappear completely in accordance with the modification made to the corresponding blocks.

According to a third example, the invention modifies the re-initialization values of the predictors used for the decoding of the DC coefficients.

It was presented above that during the decoding of an MPEG stream the DC coefficients of the Intra blocks are calculated from a "predictor" recorded by the reader and corresponding to the last DC coefficient decoded and from the value transmitted in the stream for the differential part of this DC coefficient (the "differential coefficient"), that is added to the predictor. To avoid a divergence of the predictor, it is re-initialized regularly by the reader when the reader reads the re-initialization variable in the stream.

In MPEG-2, the re-initialization variable of the predictor of the DC coefficients is calculated directly from the digital field called "Intra_DC_precision" that is sent with each picture in the field called "picture coding extension". The re-initialization value is used by the reader for the Intra blocks, that is to say, the blocks transmitted entirely and not calculated from blocks of preceding or following pictures by prediction of the movement as authorized by the MPEG-2 norm. For example, an I picture is composed solely of Intra blocks, but it can also have them in a B or P picture. In the case of MPEG-2, the re-initialization value is especially used at each "slice" start (a slice is a structure of the image corresponding to a complete row of macroblocks) and each time that a non-Intra block is decoded.

A variant of this example is realized with a stream whose format comprises means for re-initialization of the predictor other than a variable transmitted with each picture. These means are thus transmitted at different intervals: once for the entire stream and once per slice, for example.

The invention therefore relates to decoding configuration information that determines the re-initialization values of the predictors of the DC coefficients to be used in the Intra blocks. This third example follows the same process as the first example described above. The difference between these examples is the type of modifications applied to the original stream and therefore the content of the complementary digital information sent in real time by server 12 to client 8.

Thus, in this third example, analysis system 121 of portal 12 therefore reads entering MPEG stream 101 and each time that it detects a picture it identifies in the code the data permitting the calculation of the re-initialization value of the predictors of the DC coefficients to be applied during the decoding of the picture. Analysis device 121 decides according to a random law to modify the re-initialization value of the DC coefficients of the picture by replacing it with a value that is randomly selected but in conformity with the original stream. If the re-initialization value of the DC coefficients of a picture is modified, analysis device 121 stores the reference of this picture and the original re-initialization value of the DC coefficients in the complementary digital information. Once all the pictures of the stream have been analyzed, the complementary digital information stored in output buffer 123 therefore contains the references of all the modified pictures and the original re-initialization value. The complementary digital information subsequently permits reconstitution of the start sequence in box 8 by replacing the modified re-initialization values with the original values contained in the complementary digital information.

Just as in the first example, user 8 can decide to view the modified main stream stored on a hard disk without connecting to server 12. In this instance, since the modifications made to the stream do not modify the format of this stream, it will be displayed without problems on viewing screen 6, but will not be correct from the standpoint of human visual perception because certain blocks will have been reconstructed with a bad predictor for the DC coefficient.

If user 8 desires to actually view the film, the user connects to server 12 and synthesis device 87 can reconstruct the original stream from the modified main stream and from the original re-initialization values contained in the complementary digital information.

In the instance in which the user is viewing the visual content of the modified main stream, the result has significant defects: The average levels of the luminosity and chrominance of the image change completely on a regular basis and in a random manner and numerous artifacts are visible.

The description of the invention was presented above for the particular case of MPEG but can be applied to any stream whose format respects the conditions such as they are described above.

Likewise, the examples do not constitute a limit to the scope of the invention, as defined in the appended claims, that applies to any other decoding configuration information transmitted in the stream.

The invention claimed is:

1. A process for secure distribution of video sequences codes in accordance with a nominal stream format comprising visual data and data for configuration of decoding of the video sequences codes that does not represent the visual data, the process comprising:
   receiving a first video stream having a nominal video format;
   analyzing and storing data related to the configuration of the decoding of the first video stream, the stored data representing data necessary for the configuration of the decoding;
   modifying the first video stream to replace intercalate the stored data with false decoding data of the same nature as the stored data while maintaining the nominal video format to obtain a modified second video stream, the false decoding data being a modification of the data for the configuration of the decoding, wherein the modified second video stream is incorrect from a visual standpoint of a human but correct from an MPEG format standpoint;
   creating a third stream with the stored data, wherein the third stream represents a portion of the data of the first video stream;
   transmitting the modified second video stream and the third stream in separate streams to a receiving device; and
   aggregating in the receiving device the second modified video stream and the third stream by replacing the stored data contained in the third stream into the second modified video stream to obtain the first video stream.

2. The process of claim 1, wherein the data for the configuration of the decoding comprises a scanning type applied to the first video stream.

3. The process of claim 1, wherein the data for the configuration of the decoding comprises a reference that represents a quantification parameter applied to the first video stream.

4. The process of claim 1, wherein the data for the configuration of the decoding comprises a reference that represents a re-initialization value applied to the first video stream.

5. The process of claim 1, wherein the nominal stream format comprises pictures comprising blocks of coefficients, and wherein the data for the configuration of the decoding comprises data defining a mode of organization of coefficients in the nominal stream format for its transmission.

6. The process of claim 1, wherein the nominal stream format comprises pictures comprising blocks of coefficients, wherein the coefficients are quantified according to at least one quantification step, and wherein the data for the configuration of the decoding comprises data permitting calculation of the quantification steps.

7. The process of claim 1, wherein the nominal stream format comprises pictures comprising blocks of coefficients, wherein at least one of the coefficients is calculated from a previously determined predictor and from a differential value contained in the nominal stream format, and wherein the data for the configuration of the decoding comprises data permitting calculation of re-initialization values of the predictor.

8. The process of claim 1, wherein a plurality of decoding parameters defined by the data for the configuration of the decoding are modified.

9. The process of claim 8, wherein modifications made to the data for the configuration of the decoding vary during the analysis.

10. The process of claim 1, wherein the nominal stream format is based on a MPEG-2 norm.

11. A system for secure distribution of video sequences comprising:
   an apparatus for production of a video stream that employs a nominal stream format comprising visual data and data for configuration of decoding of the video stream that does not represent the visual data, wherein, prior to transmission to client equipment, wherein the apparatus is configured to:
   analyze and store data related to the configuration of the decoding of the first video stream, the stored data representing data necessary for the configuration of the decoding;
   modify the first video steam to intercalate the stored data with false decoding data of the same nature as the stored data while maintaining the nominal video format to obtain a modified second video stream, the false decoding data being a modification of the data for the configuration of the decoding, wherein the modified second video stream is incorrect from a visual standpoint of a human but correct from an MPEG format standpoint;
   create a third stream with the stored data;
   transmit the modified second video stream and the third stream in separate streams to a receiving device; and
   aggregate in the receiving device the second modified video stream and the third stream by replacing the stored data contained in the third stream into the second modified video stream to obtain the first video stream;
   the system further comprising:
   at least one device for re-composition and viewing of the first video stream; and
   at least one telecommunication network between the production apparatus and the device of re-composition equipment for communication therebetween.

12. The system of claim 11, wherein the data for the configuration of the decoding comprises a scanning type applied to the first video stream.

13. The system of claim 11, wherein the data for the configuration of the decoding comprises a reference that represents a quantification parameter applied to the first video stream.

14. The system of claim 11, wherein the data for the configuration of the decoding comprises a reference that represents a re-initialization value applied to the first video stream.

15. The process of claim 1, wherein the third stream is transmitted in response to a request by a user.

* * * * *